United States Patent
Cho et al.

(10) Patent No.: US 9,217,587 B2
(45) Date of Patent: Dec. 22, 2015

(54) AIR CONDITIONER

(71) Applicants: Eunjun Cho, Seoul (KR); Cheolmin Kim, Seoul (KR)

(72) Inventors: Eunjun Cho, Seoul (KR); Cheolmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 492 days.

(21) Appl. No.: 13/649,568

(22) Filed: Oct. 11, 2012

(65) Prior Publication Data

US 2013/0091882 A1    Apr. 18, 2013

(30) Foreign Application Priority Data

Oct. 12, 2011  (KR) .......................... 10-2011-0104245

(51) Int. Cl.
    *F25B 13/00*    (2006.01)
    *F25B 47/02*    (2006.01)

(52) U.S. Cl.
    CPC ............... *F25B 13/00* (2013.01); *F25B 47/022* (2013.01); *F25B 2313/02741* (2013.01); *F25B 2313/0315* (2013.01); *F25B 2400/0411* (2013.01); *F25B 2600/111* (2013.01); *F25B 2600/2513* (2013.01); *F25B 2600/2519* (2013.01); *F25B 2700/11* (2013.01); *Y02B 30/743* (2013.01)

(58) Field of Classification Search
    CPC ...... F25B 47/02; F25B 47/025; F25B 49/027; F25B 2313/025; F25B 2313/0251; F25B 2313/0254; F25B 2313/02542; F25B 2347/02
    USPC ..................... 62/151, 156, 159, 160, 277, 278
    See application file for complete search history.

(56) References Cited

U.S. PATENT DOCUMENTS

2005/0257557 A1*  11/2005  Chin et al. ................... 62/324.1

FOREIGN PATENT DOCUMENTS

| EP | 1 321 727 A2 | 6/2003 |
|----|---|---|
| EP | 1 437 557 A1 | 7/2004 |
| EP | 2 410 262 A1 | 1/2012 |
| JP | 58-085044 | 5/1983 |
| JP | 7-305925 A | 11/1995 |
| JP | 2008-190789 A | 8/2008 |
| JP | 2008-256256 A | 10/2008 |
| JP | 2010-101570 A | 5/2010 |
| JP | 2010159926 | 7/2010 |
| KR | 1998-076725 A | 11/1998 |
| KR | 1020120121583 A | 11/2012 |

* cited by examiner

*Primary Examiner* — Marc Norman
(74) *Attorney, Agent, or Firm* — Dentons US LLP (57) ABSTRACT

There is disclosed an air conditioner including a compressor to compress refrigerant, an indoor heat exchanger to cool or heat a room, using the refrigerant, an outdoor heat exchanger to heat-exchange the refrigerant with outdoor air, the outdoor heat exchanger comprising a front heat exchange member and a rear heat exchange member, and a defrosting module to adjust an opening degree of a passage of the refrigerant drawn into the front heat exchange member and the rear heat exchange member, wherein the defrosting module includes a first expansion valve to adjust an opening of a passage of the refrigerant introduced into the front heat exchange member and a defrosting unit to adjust an opening degree of a passage of the refrigerant between the front heat exchange member and the rear heat exchange member.

18 Claims, 7 Drawing Sheets

AIR CONDITIONER

CROSS-REFERENCE TO RELATED APPLICATION

This application claims priority under 35 U.S.C. §119 from Korean Application No. 10-2011-0104245 filed on Oct. 12, 2011, the subject matter of which is incorporated herein by reference.

BACKGROUND

1. Field of the Invention

Embodiments of the invention relates to an air conditioner, more particularly, to an air conditioner that is able to implement a defrosting mode while supplying warm air to a room continuously, by operating an front heat exchange member of an outdoor heat exchanger as a condenser for condensing refrigerant and by maintaining a rear heat exchange member as an evaporator.

2. Discussion of the Related Art

An air conditioner is an electric device configured to heat/cool or purify room air to establish the comfortable indoor environment.

Such an air conditioner may be classified into a separate type air conditioner having an indoor unit and an outdoor unit separately and an integral type (or wall type) air conditioner having an indoor unit and an outdoor unit integrally formed with each other as one device. Also, the air conditioner may be classified based on the volume of the capacity, into a single type air conditioner configured for a small place, with a capacity capable of operating one indoor unit, a large type air conditioner with a large capacity fitted to a company or restaurant, and a multi-type air conditioner with a capacity capable of operating a plurality of indoor units sufficiently.

The separate type air conditioner consists of the indoor unit installed in a room to supply warm air or cool air and the outdoor unit configured to perform compression, expansion and so on with respect to refrigerant to enable the indoor unit to perform sufficient heat exchanging.

The air conditioner has a circulation cycle of compression, condensation, expansion and evaporation with respect to refrigerant circulating therein sequentially, to transmit heat. The air conditioner may be operated by a cooling cycle exhausting the heat of the room outside in the summer and a heating cycle of a heat pump circulating air in the reverse direction in the window to supply heat to a room Meanwhile, when the air conditioner is operated by the cooling cycle, a heat exchanger provided in the outdoor unit (hereinafter, an outdoor heat exchanger) absorbs heat and refrigerant is evaporated. After that, heat is exhausted while the refrigerant is condensed in a heat exchanger provided in the indoor unit (hereinafter, an indoor heat exchanger). However, when the heat is absorbed while the refrigerant of the outdoor unit is evaporated, a surface temperature is lowered remarkably and the lowered surface temperature makes frost occur on a surface of the outdoor heat exchanger. Accordingly, there might be a problem of lowered heat exchange efficiency in the outdoor heat exchanger.

In a conventional defrosting method used in a conventional air conditioner to remove frost from the surface of the outdoor heat exchanger, the circulation of the refrigerant in the heating cycle is reversed into the circulation in the cooling cycle. In other words, when the heating cycle is converted into the cooling cycle, the refrigerant of the outdoor heat exchanger is condensed and heat is emitted. Such an emitted heat may remove the frost from the surface of the outdoor heat exchanger.

However, in such a conventional defrosting method using the cooling cycle, indoor heating has to be stopped and the indoor temperature might be disadvantageously lowered while the low temperature refrigerant is heat-exchanged with room air by the indoor heat exchanger. Also, during the defrosting process, the temperature of the indoor heat exchanger is lowered. When the heating mode re-starts after the defrosting mode, it takes quite a long time to heat air.

SUMMARY

Accordingly, the embodiments may be directed to an air conditioner. To solve such the problems, an air conditioner according to the present invention includes a compressor configured to compress refrigerant; an indoor heat exchanger configured to cool or heat a room, using the refrigerant; a first expansion valve configured to expand the refrigerant; an outdoor heat exchanger configured to heat-exchange the refrigerant with outdoor air, the outdoor heat exchanger comprising a front heat exchange member and a rear heat exchange member; and a defrosting module configured to control an opening degree of a passage of the refrigerant drawn into the front heat exchange member and the rear heat exchange member, wherein the defrosting module a first defrosting unit configured to control an opening degree of a passage of the refrigerant between the front heat exchange member and the rear heat exchange member.

The first defrosting unit may be a valve that expands refrigerant by opening/closing or controlling an opening degree of a passage of the refrigerant.

The first defrosting unit according to the present invention may include an opening/closing valve configured to open and close the passage of the refrigerant and a second expansion valve connected with the opening/closing valve to expand the refrigerant.

The defrosting module may further include a second defrosting unit configured to defrost the rear heat exchange member.

The second defrosting unit may be a 4-way valve.

The outdoor heat exchanger may further include a first temperature sensor provided in the front heat exchange member, a second temperature sensor provided in the rear heat exchange member and an outdoor temperature sensor for measuring the outdoor temperature.

The air conditioner according to the present invention may include a controller configured to control the compressor, the indoor heat exchanger, the first expansion valve, the outdoor heat exchanger and the defrosting module. The controller controls the first expansion valve and the first defrosting unit to defrost the front heat exchange member and the second heat transfer member.

The air conditioner according to the present invention may include a controller configured to control the compressor, the indoor heat exchanger, the first expansion valve, the outdoor heat exchanger and the defrosting module. The controller may control the first expansion valve and the opening/closing valve and the second expansion valve provided in the first defrosting unit.

The air conditioner according to the present invention may include a controller configured to control the compressor, the indoor heat exchanger, the first expansion valve, the outdoor heat exchanger and the defrosting module. The controller controls the first expansion valve and the first defrosting unit to defrost the front heat exchange member and the second heat exchange member.

In another aspect of the present invention, a defrosting method of an air conditioner includes a step of determining whether frost occurs on the front heat exchange member; a step of defrosting the front heat exchange member, using the refrigerant after passing the first expansion valve, by controlling an opening degree of the first expansion valve, when frost occurs on the front heat exchange member based on the result of the determination; a step of controlling the first defrosting unit of the defrosting module to expand the refrigerant after passing the front heat exchange member; and a step of heat-exchanging the refrigerant drawn into the rear heat exchange member after passing the first defrosting unit, for room heating.

In the step of controlling the first defrosting unit of the defrosting module to expand the refrigerant after passing the front heat exchange member, the first defrosting unit is a valve for opening/closing the passage of the refrigerant or expanding the refrigerant.

The first defrosting unit according to the present invention may include an opening/closing valve for opening and closing a passage; and a second expansion valve connected with the opening/closing valve in parallel, to expand the refrigerant. The step of controlling the first defrosting unit to expand the refrigerant after passing the front heat exchange member may include a step of drawing the refrigerant into the second expansion valve by closing the opening/closing valve; and a step of controlling the second expansion valve to expand the refrigerant.

The defrosting module according to the present invention may further include a second defrosting unit. The defrosting method may further include a step of determining whether front occurs on the rear heat exchange member, after the step of determining whether front occurs on the front heat exchange member; a step of defrosting the rear heat exchange member by controlling the second defrosting unit to draw the refrigerant after passing the compressor into the rear heat exchange member in a cooling mode; and a step of defrosting the front heat exchange member by controlling the refrigerant to defrost the front heat exchange member by passing the refrigerant through the first defrosting unit after passing the rear heat exchange member.

In a further aspect of the present invention, a defrosting method of an air conditioner includes a step of determining whether to implement a heating mode for heating a room; a step of determining whether frost occurs on a front heat exchange member in the heating mode, when the heating mode is implemented based on the result of the determination; a step of defrosting the front heat exchange member, using the refrigerant after passing the first expansion valve, by controlling an opening degree of the first expansion valve when frost occurs on the front heat exchange member; a step of controlling a first defrosting unit of the defrost mode controller to expand the refrigerant after passing the front heat exchange member; a step of heat-exchanging the refrigerant for room heating by drawing the refrigerant into the rear heat exchange member after passing the first defrosting unit; a step of re-implementing the heating mode by controlling an opening degree of the first expansion valve to operate the front heat exchange member as an evaporator and by controlling the first defrosting unit to draw the refrigerant having passed the front heat exchange member into the rear heat exchange member without loss of the pressure, when the front heat exchange member is completely defrosted; a step of determining whether frost occurs on the rear heat exchange member in the heating mode for the room; a step of defrosting the rear heat exchange member, using the refrigerant drawn into the rear heat exchange member after passing the compressor by the second defrosting unit in a cooling mode, when frost occurs on the rear heat exchange member; and a step of defrosting the front heat exchange member while the refrigerant is passing the first defrosting unit after passing the rear heat exchange member. It is to be understood that both the foregoing general description and the following detailed description of the embodiments or arrangements are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein.

DETAILED DESCRIPTION

Exemplary embodiments that are able to realize the objects and advantages specifically will be descried in reference to the accompanying drawings as follows. Reference may now be made in detail to specific embodiments, examples of which may be illustrated in the accompanying drawings.

Wherever possible, same reference numbers may be used throughout the drawings to refer to the same or like parts. It is to be understood that the terminology defined in a dictionary used herein is meant to encompass the meaning thereof disclosed in related arts. Unless for the purpose of description and should not be regarded as limiting, the terminology is not meant to be ideal or exaggerated.

It will be understood that when an element is referred to with 'first' and 'second', the element is not limited by them. They may be used only for a purpose of distinguishing the element from the other elements.

An air conditioner according to the present invention may include a compressor for compressing refrigerant, an indoor heat exchanger for cooling or heating room air, an outdoor heat exchanger for heat-exchanging between the refrigerant and outdoor air, with an front heat exchange member and a rear heat exchange member, and a defrosting module for controlling a defrosting process of the outdoor heat exchanger.

Such a defrosting module controls an opening degree of a refrigerant passage to the front heat exchange member and the rear heat exchange member. The defrosting module includes a first expansion valve for controlling an opening degree of a refrigerant passage to the front heat exchange member and a defrosting unit for controlling an opening degree of a refrigerant passage between the front and rear heat exchange members.

The air conditioner according to the present invention may further include a controller configured to control the defrosting module to operate the front or rear heat exchange member as a condenser in a defrosting mode selectively.

The front heat exchange member is arranged in an outer position, compared with the rear heat exchange member. The front and rear heat exchange members may be connected with each other by a cooling fin. The front heat exchange member includes a first tube where the refrigerant flows. Also, the rear heat exchange member includes a second tube where the refrigerant flows. And, a first tube and the second tube pass through the cooling fin.

In addition, when the interior or rear heat exchange member is frosted during the heating mode, the controller may increase the opening degree of the first expansion valve to draw a high temperature refrigerant into the front heat exchange member and simultaneously decrease an opening degree of the defrosting unit to expand the refrigerant having passed the front heat exchange member into a low temperature refrigerant to operate the front heat exchange member as the condenser.

The controller may increase an opening degree of the first expansion valve when the temperature of the rear heat exchange member is getting lowered.

When frost occurs only on the front heat exchange member during the heating mode, the controller may increase the opening degree of the first expansion valve to draw the high temperature refrigerant into the front heat exchange member and it may decrease an opening degree of the defrosting unit to expand the refrigerant having passed the heat transfer member at a low temperature simultaneously, such that the heat transfer member may be operated as the condenser.

Also, when frost occurred on both of the front and rear heat exchange members during the heating mode, the controller may open the defrosting unit and operate the air conditioner in the same cycle as the cooling mode simultaneously, such that the front and rear heat exchange members as the condensers.

The defrosting unit may include an opening/closing valve for making the passage of the refrigerant be on and off and a second expansion valve connected to the opening/closing valve in parallel to expand the refrigerant.

When frost occurs only on the front heat exchange member during the heating mode, the controller may increase the opening degree of the first expansion valve to draw the high temperature refrigerant into the front heat exchange member and it may decrease an opening degree of the defrosting unit to expand the refrigerant having passed the heat exchange member at a low temperature simultaneously, such that the heat exchange member may be operated as the condenser.

When frost occurred only on the front heat exchange member during the heating mode, the controller may increase an opening degree of the first expansion valve to draw a high temperature refrigerant into the heat exchange member and simultaneously close the opening/closing valve to expand the refrigerant having passed the heat exchange member at a low temperature in the second expansion valve, such that the heat exchange member may be operate as the condenser.

In addition, there may be further provided a first temperature sensor positioned in the front heat exchange member and a second temperature sensor positioned in the rear heat exchange member.

The controller controls the first temperature sensor and the second temperature sensor to measure the temperatures of the front heat exchange member and the rear heat exchange member, respectively, to determine whether the front heat exchange member and the rear heat exchange member are frosted.

Moreover, an outdoor fan may be further provided to control the flow of outdoor air heat-exchanged with the outdoor heat exchanger. When the defrosting mode is implemented by operating only the front heat exchange member as the condenser, the controller may control the outdoor fan not to prevent water or water vapors melted from the front heat exchange member from flowing toward the rear heat exchange member.

The defrosting unit may be an electric ball valve.

The heat exchanging amount of the rear heat exchange member may be larger than that of the front heat exchange member.

According to another embodiment, an air conditioner may include a compressor for compressing refrigerant, an indoor heat exchanger for cooling or heating a room by using the refrigerant, an outdoor heat exchanger having an front heat exchange member and a rear heat exchange member, to heat-exchange between the refrigerant and outdoor air, and a defrosting module for controlling an opening degree of a refrigerant passage to the front heat exchange member and the rear heat exchange member. The front heat exchange member may be arranged in an outer position, compared with the rear heat exchange member and the front and rear heat exchange members may be connected with each other by a cooling fin.

The defrosting module may include a first expansion valve for controlling an opening degree of a refrigerant passage to the front heat exchange member and a defrosting unit for controlling an opening degree of a refrigerant passage between the front heat exchange member and the rear heat exchange member.

The air conditioner may further include a controller for controlling the defrosting module to operate the front heat or the rear heat exchange member as a condenser selectively.

When frost occurs only on the front heat exchange member during the heating mode, the controller may increase an opening degree of the first expansion valve to draw a high temperature refrigerant into the front heat exchange member and simultaneously decrease an opening degree of the defrosting unit to expand the refrigerant having passed the front heat exchange member at a low temperature, such that the front heat exchange member may be operated as the condenser.

When frost occurs on the front heat exchange member and the rear heat exchange member during the heating mode, the controller may open the defrosting unit and simultaneously operate the air conditioner by the same cycle as the cooling mode, such that the front and rear heat exchange members may be operated as the condensers.

The rear heat exchange member may be arranged adjacent to the front heat exchange member to transfer the condensation heat of the refrigerant to the front heat exchange member, when the front heat exchange member is operated as the condenser.

The defrosting module according to the present invention may include a first expansion valve and a first defrosting unit provided between the front heat exchange member and the rear heat exchange member. The defrosting module may selectively the front heat exchange member as the condenser to remove frost of the front heat exchange member. At this time, the rear heat exchange member may be continuously operated as an evaporator to implement the defrosting mode, simultaneously while supplying warm air to the room. Such the defrosting mode will be described in detail as follows, referring to the accompanying drawings.

Figure 1:
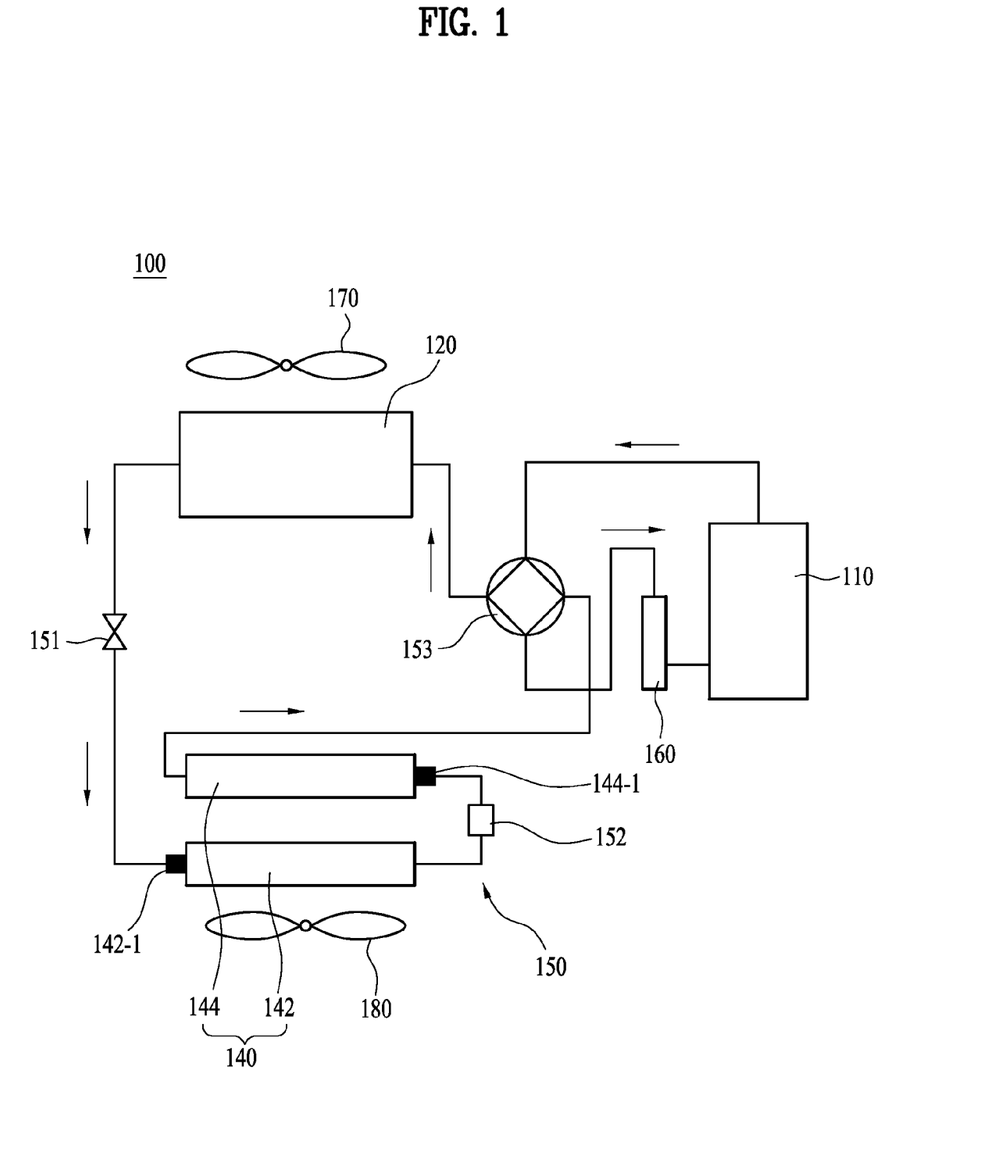
FIG. 1 is a block diagram of an air conditioner according to a first embodiment of the present invention.

As shown in FIG. 1, an air conditioner 100 according to a first embodiment of the present invention may include a compressor 110, an indoor heat exchanger 120, an outdoor heat exchanger 140 having an front heat exchange member 142 and a rear heat exchange member 144, and a defrosting module 150 for controlling an opening degree of a refrigerant passage to the front heat exchange member 142 and the rear heat exchange member 144.

In this instance, the defrosting module 150 may be a device provided between the front heat exchange member 142 and the rear heat exchange member 144 to control an opening degree of a refrigerant passage.

For convenience sake, the defrosting module may be referenced to as 'a first defrosting unit' to distinguish the defrosting module from a device for controlling an opening degree of a passage to switch a heating mode and a cooling mode during the defrosting mode, which will be described later.

Such a first defrosting unit 152 may be a valve that is able to expand the refrigerant by controlling the refrigerant passage to be on and off or by controlling an opening degree of the refrigerant passage.

Meanwhile, the defrosting module 150 may further include a second defrosting unit 153 that is able to defrost the rear heat exchange member 144 by switching the heating mode and the cooling mode with each other.

The air conditioner 100 may further include an accumulator 160 configured to prevent liquid refrigerant from drawn into the compressor 110 and to filter foreign matters, to enhance the performance of the compressor 110.

The air conditioner 100 may operate an indoor fan 170 to blow indoor air toward the indoor heat exchanger 120 or into the room or it may operate an outdoor fan 180 to blow outdoor air toward the outdoor heat exchanger 140 or outside the room. In addition, the rear heat exchange member 144 may be positioned in the outdoor heat exchanger 140. Specifically, the front heat exchange member 142 may be arranged in an outer position, in contact with outdoor air first and the rear heat exchange member may be inner behind the front heat exchange member 142.

First of all, the process of the cooling mode implemented by the air conditioner 100 will be described as follows.

Gas refrigerant compressed by the compressor 110 may be drawn into the outdoor heat exchanger 140 and the gas refrigerant is phase-changed into liquid refrigerant, while passing the rear heat exchange member 144 and the front heat exchange member 142. The refrigerant emits condensation heat when the phase thereof is changed. At this time, the defrosting unit 152 may be kept open (namely, on) and the refrigerant after passing the rear heat exchange member 144 may be supplied to the front heat exchange member 142 without loss of the compression.

Hence, the refrigerant exhausted from the outdoor heat exchanger 140 is expanded while passing the first expansion valve 151. After that, the expanded refrigerant may be drawn into the indoor heat exchanger 120. The liquid refrigerant drawn into the indoor heat exchanger 120 may be phase-changed into gas refrigerant. At this time, the refrigerant absorbs vaporization heat required to phase-change in the indoor heat exchanger 120, such that the room may be cooled.

Next, the process of the room heating mode implemented by the air conditioner 100 will be described as follows. Outdoor air is heat-exchanged with a low temperature refrigerant in the front heat exchange member 142 and the rear heat exchange member 144 composing the outdoor heat exchanger 140, such that the refrigerant may be evaporated. Also, the first defrosting unit 152 may be kept open (namely, on) and the refrigerant may be drawn into the rear heat exchange member 144 after passing the front heat exchange member 142), without loss of the pressure.

The evaporated refrigerant may be compressed after drawn into the compressor 110 and the compressed refrigerant is heat-exchanged with room air in the indoor heat exchanger 120, such that gas refrigerant may be condensed. In this process, the condensation heat of the refrigerant is generated and the room can be heated by the condensation heat.

Meanwhile, when the air conditioner 100 is operated in the heating mode for a relatively long time, a surface temperature of the outdoor heat exchanger 140 is remarkably lowered in a process of evaporating the refrigerant of the outdoor heat exchanger 140 and frost occurs on a surface of the outdoor heat exchanger 140. Especially, more frost occurs on the front heat exchange member contacting with outdoor air earlier. Such frost occurrence generates heat insulation on the surface of the outdoor heat exchanger 140, only to generate a disadvantage of deteriorating the heat exchange ability of the outdoor heat exchanger 140. Accordingly, the air conditioner 100 requires a process of removing the frost occurring on the outdoor heat exchanger 140.

A process of the defrosting mode implemented in the air conditioner 100 according to the present invention will be described as follows. The air conditioner 100 includes the controller (not shown). The controller controls a first temperature sensor 142-1 provided in the front heat exchange member 142 of the outdoor heat exchanger 140, a second temperature sensor 144-1 provided in the front heat transfer 144 and an outdoor temperature sensor for measuring an outdoor temperature, to determine whether frost occurs on the outdoor heat exchanger 140 during the heating mode. Specifically, when the outdoor temperature is 0° C. or higher and the temperature measured by the first temperature sensor 142-1 or the second temperature sensor 144-1 is −7° C. or lower, the controller may implement the defrosting mode. When the outdoor temperature is −5° C. or lower and the temperature the temperature measured by the first temperature sensor 142-1 or the second temperature sensor 144-1 is −11° C. or lower, the controller implements the defrosting mode. When the outdoor is between −5° C. and 0° C. and the temperature the temperature measured by the first temperature sensor 142-1 or the second temperature sensor 144-1 is lower than −8° C., the controller implements the defrosting mode.

Figure 4:
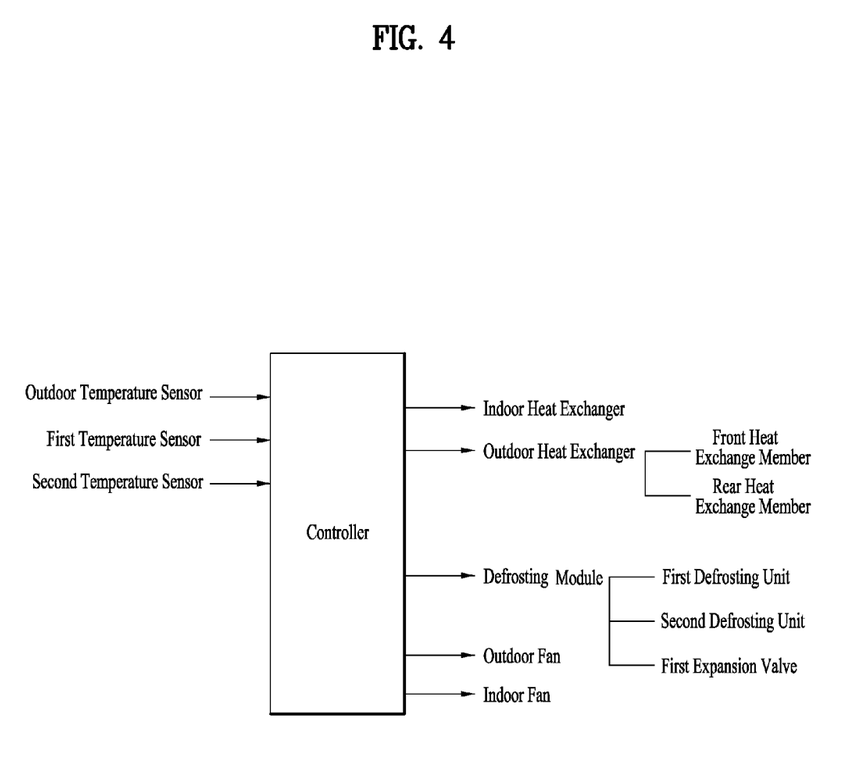
FIG. 4 is a block diagram of a controller according to the present invention.

As shown in FIG. 4, the controller not only determines whether frost occurs but also controls each of the components of the air conditioner 100. Meanwhile, when it determines that frost occurs only on the front heat exchange member 142 based on the outdoor temperature and the measured temperature of the first temperature sensor 142-1, the controller may implement the defrost mode which will be described as follows.

First of all, the refrigerant compressed by the compressor 110 is drawn into the indoor heat exchanger 120 and the refrigerant generates heat while being condensed. The generated heat may heat the room continuously. The condensed refrigerant is drawn into the first expansion valve 151 and the refrigerant is expanded by a higher pressure than a pressure at an inlet of the outdoor heat exchanger 140. After that, such high temperature refrigerant is exhausted from the first expansion valve 151 (see FIG. 5). Preferably, the refrigerant is expanded until it has a predetermined temperature and a pressure sufficient to defrost the front heat exchange member 142 without overheating the front heat exchange member 142.

At this time, the controller may gradually increase an opening degree of the first expansion valve 151 when the temperature of the front heat exchange member 142 or the rear heat exchange member 144 is getting lower. The lower temperatures of the front heat exchange member 142 or the rear heat exchange member 144 means the more frost occurred thereon proportionally. Accordingly, the opening degree of the first expansion valve 151 is increased to increase the temperature of the refrigerant drawn into the front heat exchange member 142.

Hence, the high temperature refrigerant is drawn into the front heat exchange member 142 to be condensed. The condensing process may generate heat and the heat may remove the frost from a surface of the front heat exchange member 142. After that, the refrigerant after passing the front heat exchange member 142 may be drawn into the first defrosting unit 152. At this time, an opening degree of the first defrosting unit 152 may be controlled to expand the refrigerant at a predetermined pressure or lower and the refrigerant may be exhausted from the first defrosting unit 152 in a low temperature state. The refrigerant after passing the first defrosting unit 152 may be drawn into the rear heat exchange member 144 and the refrigerant may be evaporated while absorbing the heat of the rear heat exchange member 144. The evaporated refrigerant is compressed by the compressor 110 to be re-drawn into the indoor heat exchanger 120. After that, the refrigerant emits condensation heat to supply warm air to the room continuously.

When determining that the frost is removed from the front heat exchange member 142 based on the surface temperature of the front heat exchange member 142 measured by the first temperature sensor 142-1, the controller may operate the front heat exchange member 142 as the evaporator by controlling the opening degree of the first expansion valve 151 and it may open (namely, turn on) the first defrosting unit 152 completely to re-implement the heating mode.

Figure 5:
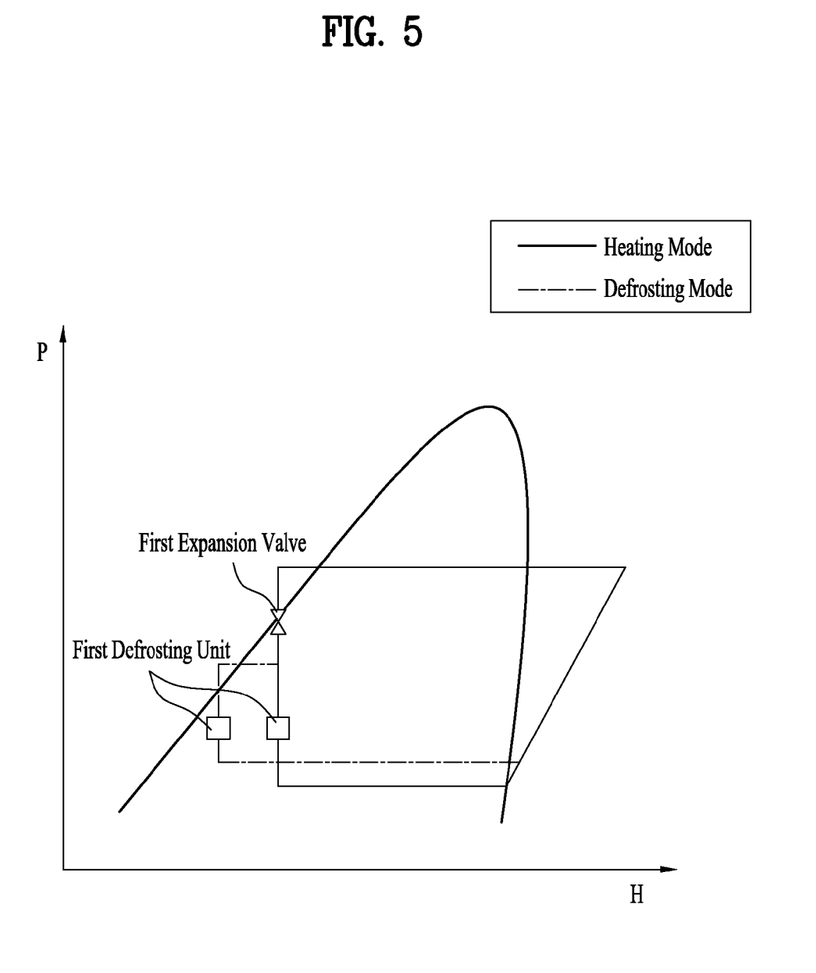
FIG. 5 is a graph showing a P-H diagram (Mollier chart) of the air conditioner according to the present invention.

As mentioned above, the first defrosting unit 12 is formed between the front heat exchange member 142 and the rear heat exchange member 144 to separate the front heat exchange member 142 and the rear heat exchange member 144 from each other, to operate only the front heat exchange member 142 as the condenser in the defrosting mode selectively. Accordingly, the rear heat exchange member 144 is operated as the evaporator even in the defrosting mode identically in the heating mode, such that the refrigerant compressed by the compressor 110 may generate heat in the indoor heat exchanger 120 to continuously heat the room even in the defrosting mode. As shown in FIG. 5, the opening degree of the first expansion valve 151 is controlled in the defrosting mode of the front heat exchange member 142, to expand the refrigerant to a temperature sufficient to melt the frost on the front heat exchange member 142. Accordingly, the overheating of the front heat exchange member 142 may be prevented. After that, when the heating mode is re-implemented after the defrosting mode, the time taken to cool the front heat exchange member 142 may be reduced and a mass of warm air may be supplied to the room in a relatively short time.

It is preferred that the front heat exchange member 142 is arranged adjacent to the rear heat exchange member 144. Accordingly, the condensation heat emitted by the refrigerant in the front heat exchange member 142 may defrost the surface of the rear heat exchange member 144 in the defrosting mode of the front heat exchange member 142. More preferably, the front heat exchange member 142 and the rear heat exchange member 144 may be integrally formed with each other, to transfer the condensation heat generated from the front heat exchange member 142 to the rear heat exchange member 144 quickly.

In the defrosting mode of the front heat exchange member 142, a blowing direction of the outdoor fan 180 is controlled to blow air outside and the water melted from the front heat exchange member 142 may not re-occur on the rear heat exchange member 144.

It is preferred that the first defrosting unit 152 is an electric ball valve. Such an electric ball valve may be open (namely, on) or closed (namely, off) by an actuator formed in the electric ball valve and the electric ball valve may be used as an expansion device. Together with that, the electric ball valve has an advantage of little pressure loss when it is open.

Meanwhile, it is preferred that the heat exchange capacity of the rear heat exchange member 144 is larger than that of the front heat exchange member 142. When implementing the defrosting mode that operates only the front heat exchange member 142 as the condenser 142, only the rear heat exchange member 144 is operated as the evaporator. Because of that, the heat capacity of the rear heat exchange member 144 may be relatively enlarged and the heating ability reduction generated by the heat exchange ability deterioration may be prevented.

Figure 3:
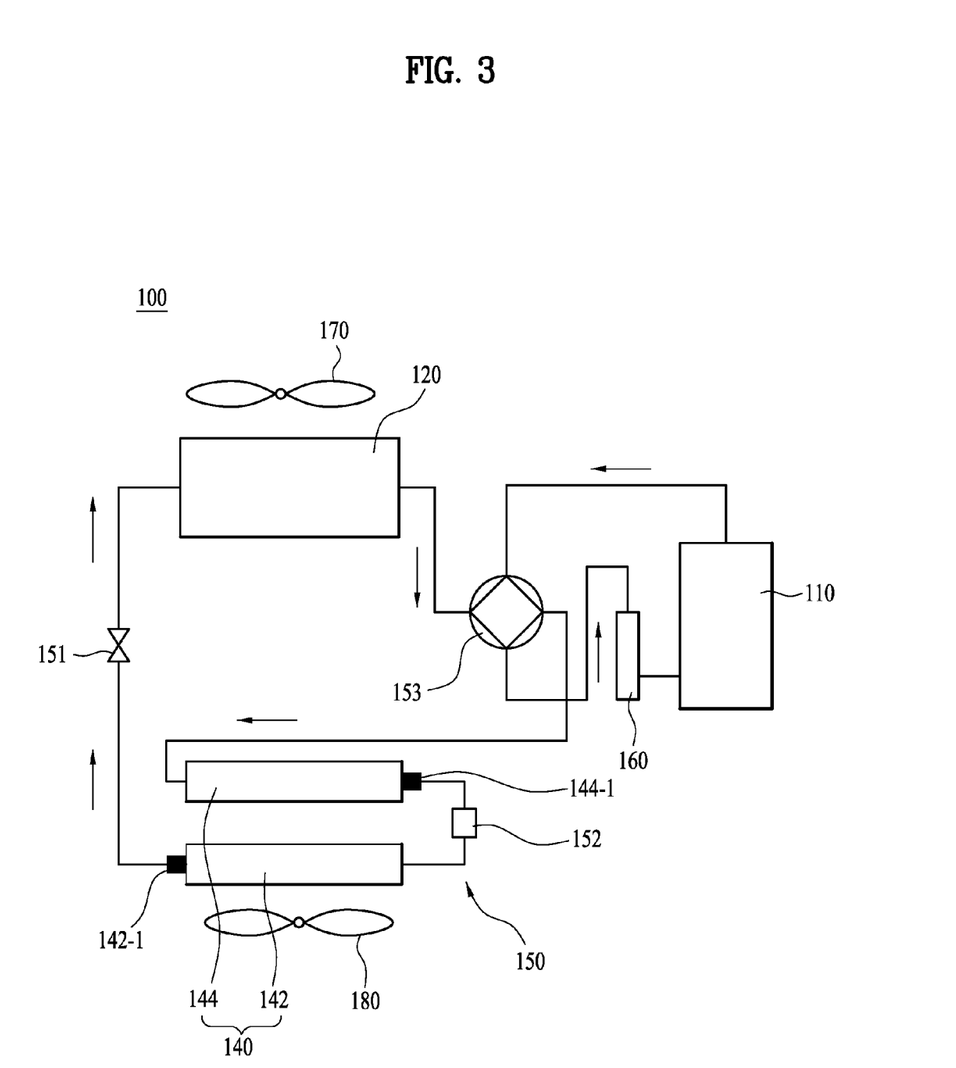
FIG. 3 is a block diagram illustrating a defrosting mode process of the air conditioner shown in FIG. 1.

When determining that frost occurs on the front heat exchange member 142 and the rear heat exchange member 144 based on the outdoor temperature and the temperature of the rear heat exchange member 144 measured by the second temperature sensor 144-1, the controller may implement the defrosting mode having the process shown as an arrow of FIG. 3. At this time, the second defrosting unit 153 is a 4-way valve that converts the refrigerant passage and it converts the passage to draw the refrigerant after passing the compressor 110 into the rear heat exchange member 144. The controller controls the first expansion valve 151, the first defrosting unit 152 and the second defrosting unit 153 to operate the air conditioner 100 in the same cycle as the cooling mode. The indoor heat exchanger 120 may be operated as the evaporator and the front heat exchange member 142 and the rear heat exchange member 144 of the outdoor heat exchanger 140 may be operated as the condenser, such that the frost may be removed from the front heat exchange member 142 and the rear heat exchange member 144 by the condensation heat of the refrigerant. According to the present invention, the frost may be partially removed from the rear heat exchange member 144 by the defrosting mode of the front heat exchange member 142. Accordingly, a frost occurrence time of the rear heat exchange member 144 may be delayed and a defrosting mode driving time of the rear heat exchange member 144 may be delayed by 2 to 5 times.

Figure 2:
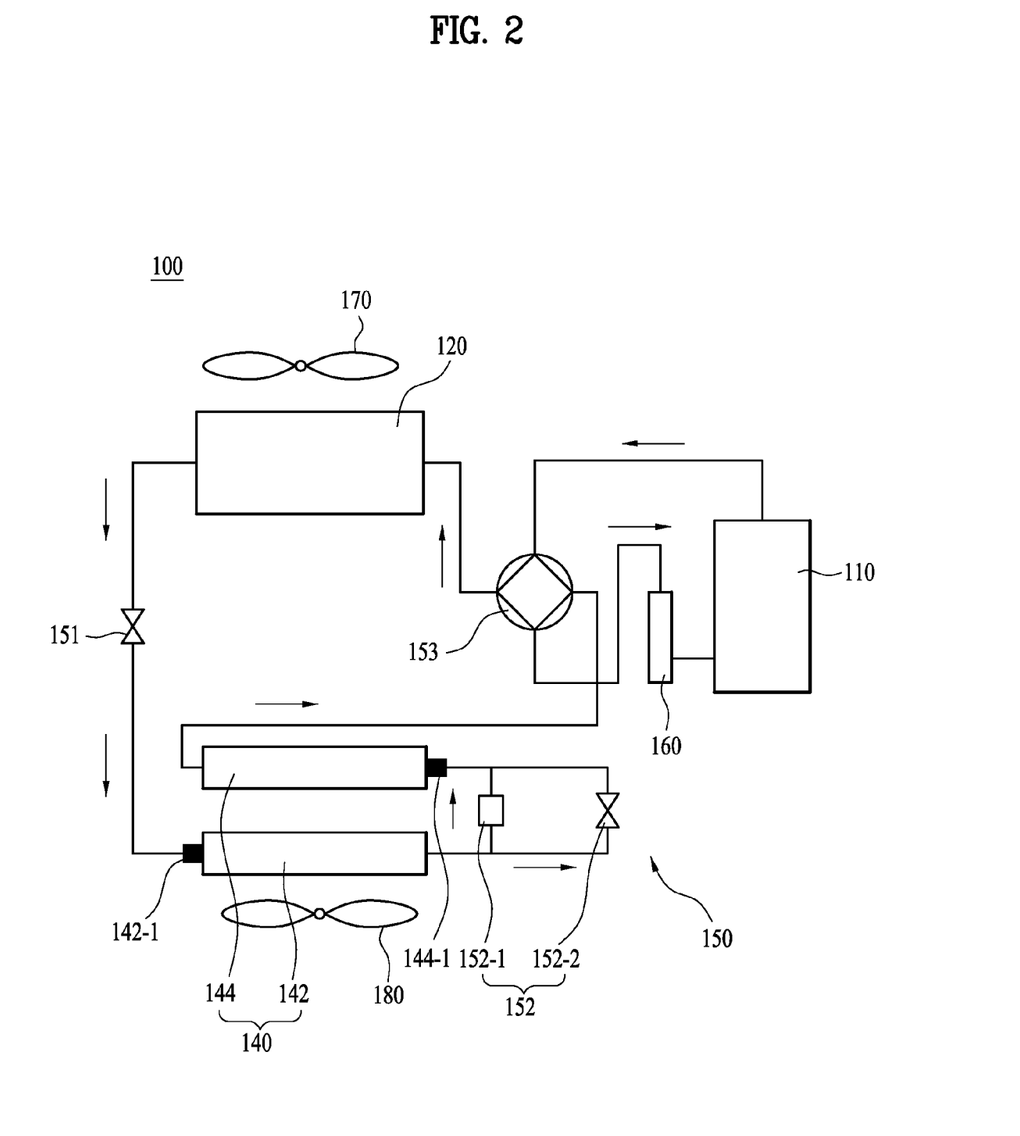
FIG. 2 is a block diagram of an air conditioner according to a second embodiment of the present invention.

As shown in FIG. 2, an air conditioner 100 according to a second embodiment of the present invention includes a compressor 110, an indoor heat exchanger 120, a first expansion valve 151, an outdoor heat exchanger 140 having an front heat exchange member 142 and a rear heat exchange member 144, and a first defrosting unit 152 formed between the front heat exchange member 142 and the rear heat exchange member 144. At this time, the first defrosting unit 152 may include an opening/closing valve 152-1 for opening/closing the passage and a second expansion valve 152-2 connected with the opening/closing vale 152-1 in parallel to expand the refrigerant.

A cooling mode and a heating mode of the air conditioner 100 according to the second embodiment will be described as follows.

First of all, in a cooling mode of the air conditioner, the opening/closing valve 152-1 of the first defrosting unit 152 may be completely open (namely, on). Gas refrigerant compressed by the compressor 110 may be drawn into the front heat exchange member 142 along a pipe way having the opening/closing valve 152-1 installed therein after passing the rear heat exchange member 144. At this time, condensation heat is generated while the gas refrigerant is phase-changed into liquid refrigerant in the rear heat exchange member 144 and the front heat exchange member 142. The refrigerant after passing the rear heat exchange member 144 is partially drawn even into a pipe way having the second expansion valve 152-2 installed therein and the amount of such the refrigerant is so small not to be a problem.

After that, the refrigerant exhausted from the front heat exchange member 142 is expanded while passing the first expansion valve 151 and the expanded refrigerant is drawn into the indoor heat exchanger 120. The liquid refrigerant drawn into the indoor heat exchanger 120 absorbs vaporization heat, while it is phase-changed into gas refrigerant, and the heat can heat the room.

Hence, in the heating mode of the air conditioner 100, a low temperature refrigerant is heat-exchanged with outdoor air in the front heat exchange member 142 and the rear heat exchange member 144, only to generate evaporation of the refrigerant. Also, the opening/closing valve 152-1 is kept open (namely, on) and the refrigerant after passing the front heat exchange member 142 may be drawn into the rear heat exchange member 144 along a pipe having the opening/closing valve 152-1 installed therein. The evaporated refrigerant is drawn into the compressor 110 to be compressed. After that, the compressed refrigerant is heat-exchanged with room air in the indoor heat exchanger 120 and the gas refrigerant is condensed accordingly. In this process, condensation heat is generated from the refrigerant to heat the room.

As mentioned above, when determining that frost occurs on the front heat exchange member 142 based on the measured outdoor temperature and the temperature of the front heat exchange member 142, the controller implements the defrosting mode.

The process of the defrosting mode will be described briefly. The refrigerant compressed by the compressor 110 is drawn into the indoor heat exchanger 120 and the drawn refrigerant generates heat while being condensed, to heat the room continuously. The condensed refrigerant is drawn into the first expansion valve 151 to be expanded and the expanded refrigerant is exhausted from the first expansion valve 151 at a high temperature. Similarly, the first expansion valve 151 may expand the refrigerant until the refrigerant has a sufficient temperature and pressure to defrost the front heat exchange member 142.

Hence, the high temperature refrigerant is drawn into the front heat exchange member 142 to be condensed. While the refrigerant is condensed, heat is generated enough to defrost a surface of the front heat exchange member 142. After that, the opening/closing valve 152-1 is closed (namely, off) and all of the refrigerant having passed the front heat exchange member 142 may flow to the second expansion valve 152-2. The refrigerant is expanded in the second expansion valve 152-2 at a predetermined pressure or lower and a low temperature refrigerant is drawn into the rear heat exchange member 144. The refrigerant is evaporated while it absorbs the heat in the rear heat exchange member 144. The evaporated refrigerant is compressed in the compressor 110 and the compressed refrigerant heats the room while it is re-supplied to the indoor heat exchanger 120.

When determining that the frost of the front heat exchange member 142 is removed based on the temperature measured by the first temperature sensor 142-1, the controller controls an opening degree of the first expansion valve 151 to exhaust the low temperature refrigerant and the front heat exchange member 142 may be operated as the evaporator. After that, the opening/closing valve 152-1 is completely open (namely, on) to re-implement the heating mode.

According to the present invention, the opening valve 152-1 and the second expansion valve 152-2 are formed between the front heat exchange member 142 and the rear heat exchange member 144, connected with each other in parallel, to separate the front heat exchange member 142 and the rear heat exchange member 144 from each other. Accordingly, only the front heat exchange member 142 may be operated as the condenser and the room can be continuously heated advantageously even in the defrosting mode.

Meanwhile, when determining that frost occurs on both of the front and rear heat exchange members 142 and 144 based on the measured outdoor temperature and the measured temperature of the rear heat exchange member 144, the controller may operate the air conditioner in the same cycle as the cooling mode of the air conditioner 100 via the passage conversion of the second defrosting unit 153 and the frost on the front heat exchange member 142 and the rear heat exchange member 144 may be removed accordingly.

Figure 6:
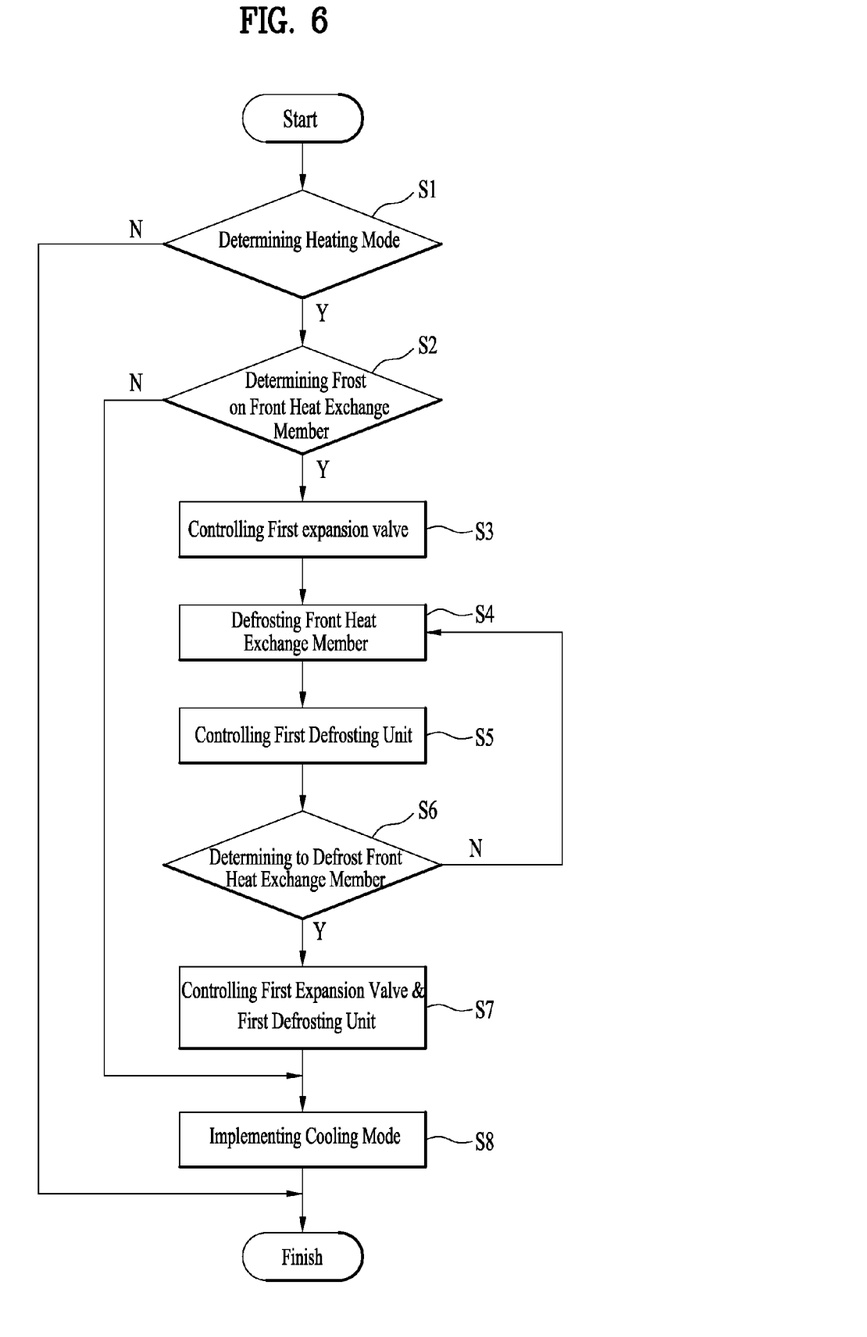
FIG. 6 is a flow chart illustrating a defrosting method of the air conditioner according to the first embodiment.

FIG. 6 is a flow chart illustrating a defrosting method of the air conditioner 100 according to the first embodiment. Referring to FIGS. 1, 2 and 6, processes composing the defrosting mode of the air conditioner 100 will be described in order. Compared with the process described above, repeated parts will be omitted or mentioned briefly.

First of all, the controller determines whether to implement a heating mode based on a user's control (S1).

Hence, in the heating mode, the controller determines whether frost occurs on the front heat exchange member 142 based on the outdoor temperature measured by the outdoor temperature sensor and the temperature of the front heat exchange member 142 measured by the first temperature sensor 142-1. When determining that frost occurs on the front heat exchange member 142, the controller implements the defrost mode (S2).

Hence, the controller controls the first expansion valve 151 to expand the refrigerant having passed the indoor heat exchanger 120 until the refrigerant exhausted from the first expansion valve 151 has a temperature sufficient to defrost the front heat exchange member 142. Such the refrigerant is drawn into the front heat exchange member 142 after passing the first expansion valve 151 of the defrost mode controller 150, such that the refrigerant may remove the frost from the front heat exchange member 142 (S3 and S4).

After that, the controller controls the first defrosting unit 152 to expand the refrigerant after passing the front heat exchange member 142, such that the refrigerant may be exhausted in a low temperature state (S5). In other words, the refrigerant condensed while passing the front heat exchange member 142 is drawn into the first defrosting unit 152 of the defrosting module 150 and the first defrosting unit 152 expands the refrigerant to make it in a low temperature and low pressure state.

At this time, the first defrosting unit 152 may be a valve that is able to open to pass the refrigerant there through or to have an opening degree thereof controllable to expand the refrigerant (see FIG. 1). Such the first defrosting unit 152 may be open in the cooling or defrosting mode and it may be employed to expand the refrigerant in the defrosting mode implemented by the front heat exchange member 142.

Optionally, the first defrosting unit 152 may include an opening/closing valve 152-1 configured to open and close the passage and a second expansion valve 152-2 connected with the opening/closing valve 152-1 in parallel to expand the refrigerant (see FIG. 2). In other words, the opening/closing valve 152-1 is open (namely, on) in the cooling or heating mode to flow the refrigerant into a pipe having the opening/closing valve 152-1 formed therein. The opening/closing valve 152-1 is closed (namely, off) in the defrosting mode to flow all of the refrigerant into a pipe having the second expansion valve 152-2 formed therein to enable the second expansion valve 152-2 to expand the refrigerant.

Meanwhile, the refrigerant after passing the first defrosting unit 152 may flow to the rear heat exchange member 144 and it may be heat-exchanged to heat the room. The refrigerant is evaporated in the rear heat exchange member 144 while absorbing heat. After that, the refrigerant is compressed in the compressor 110 and it is drawn into the indoor heat exchanger 120. The refrigerant drawn into the indoor heat exchanger 120 emits heat while it is condensed, to heat the room.

Hence, the controller determines whether all of the frost is removed from the front heat exchange member 142 based on the temperature measured by the first temperature sensor 142-1. When all of the frost is removed from the front heat exchange member 142 based on the result of the determination, the controller controls the first expansion valve 151 and the first defrosting unit 152 to re-operate the air conditioner in a normal heating mode (S6~S8). Specifically, the controller controls the opening degree of the first expansion valve 151 to expand the refrigerant after passing the indoor heat exchanger 120. Accordingly, the refrigerant is exhausted from the first expansion valve 151 in a low temperature and low pressure state. When the low temperature refrigerant is drawn into the front heat exchange member 142, the front heat exchange member 142 is operated as the evaporator and the refrigerant is partially evaporated. After that, the controller controls the first defrosting unit 152 to flow the refrigerant having passed the front heat exchange member 142 into the rear heat exchange member 144 without loss of the pressure. Accordingly, the refrigerant is completely evaporated in the rear heat exchange member 144 and the refrigerant is compressed in the compressor 110 to heat-exchange in the indoor heat exchanger 120 for the room heating.

Figure 7:
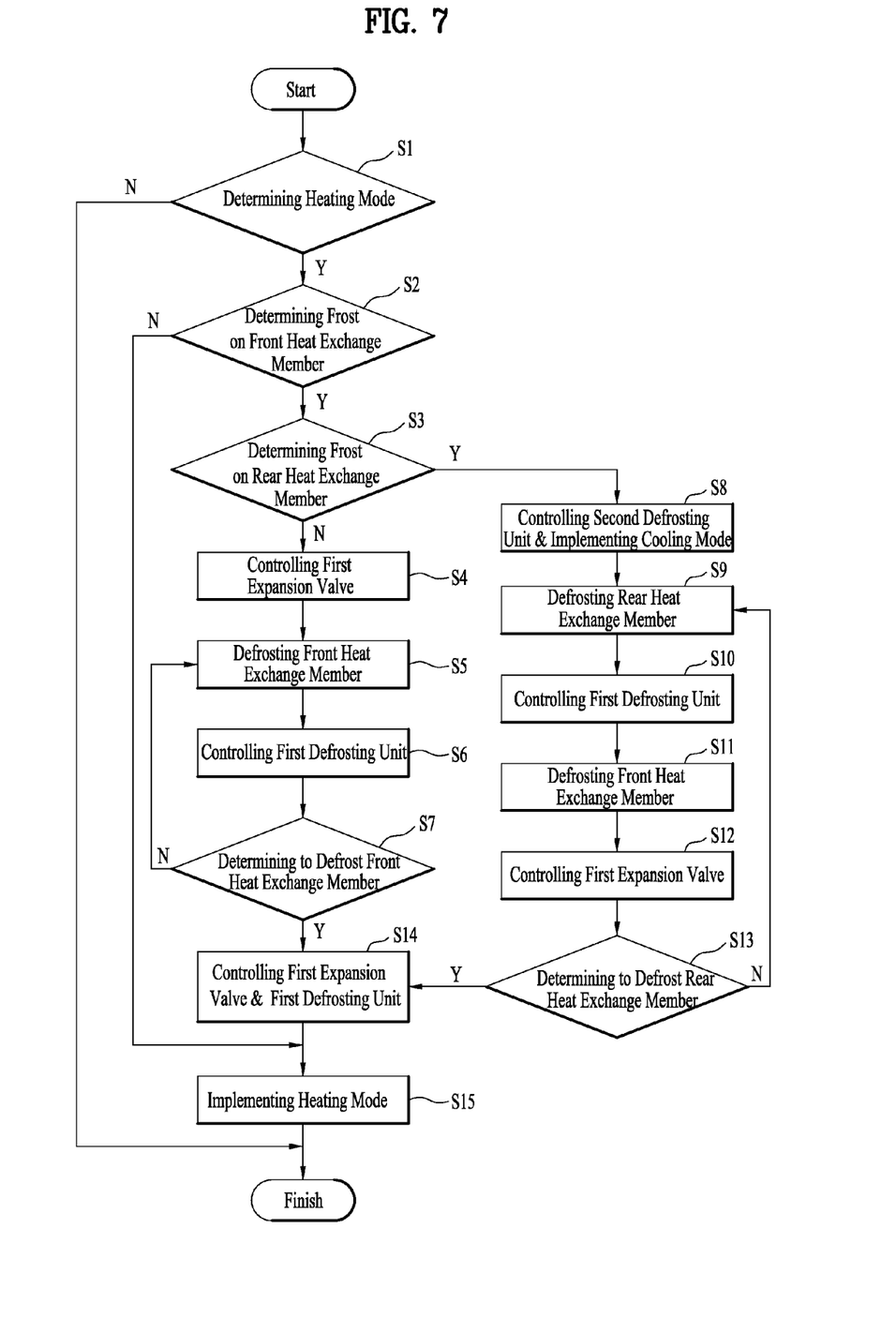
FIG. 7 is a flow chart illustrating a defrosting method of the air conditioner according to the second embodiment.

As shown in FIG. 7, a defrosting method of the air conditioner according to the second embodiment of the present invention may include a step of implementing a defrosting mode having the same cycle as a cooling mode, when it is determined that frost occurs on the front heat exchange member 142 and the rear heat exchange member 144 based on the temperatures measured by the first temperature sensor 142-1 and the second temperature sensor 144-1 (S3 and S8). At this time, the defrosting module 150 may further include the second defrosting unit 153 and the second defrosting unit 153 may be a 4-way valve that is able to convert a passage.

In other words, the controller controls the second defrosting unit 153 to enable the high temperature refrigerant after passing the compressor 110 to flow to the rear heat exchange member 144, to remove the frost from the rear heat exchange member 144. (S8 and S9).

Hence, the controller controls the first defrosting unit 152 to enable the refrigerant after passing the rear heat exchange member 144 to flow into the front heat exchange member 142 without loss of the pressure, to remove the frost from the front heat exchange member 142 (S10 and S11).

After that, the controller controls the first expansion valve 151 to expand the refrigerant after passing the front heat exchange member 142 and the refrigerant is drawn into the indoor heat exchanger 120, to heat-exchange with room air to implement the defrosting mode having the same cycle as the cooling mode (S12).

Similarly, when the controller determines that the frost is removed from the front heat exchange member 142 and the rear heat exchange member 144 based on the temperatures measured by the first temperature sensor 142-1 and the second temperature sensor 144-1, the air conditioner 100 may re-implement a normal heating mode (S13~S15).

The present invention is not limited to the embodiments described above. Optionally, the controller determines whether frost occurs on the front heat exchange member 142 and defrosting of the front heat exchange member 142 may be implemented first. While the heating mode is re-implemented, it may be determined whether the rear heat exchange member 144 and the cooling mode is implemented based on the result of the determination to defrost the rear heat exchange member 144.

The air conditioner according to the embodiments described above will have following effects.

According to the present invention, the front heat exchange member of the outdoor heat exchanger may be operated as the condenser and the rear heat exchange member is operated as the evaporator. Accordingly, warm air may be supplied to the room and the defrosting mode may be implemented simultaneously.

Furthermore, according to the present invention, the least amount of the condensation heat is used in implementing the defrosting mode configured to remove the frost of the front heat exchange member. Accordingly, the temperature of the front heat exchange member may be prevented from increasing drastically and the time taken to heat air when the heating mode is re-implemented may be reduced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner comprising:
   a compressor for compressing refrigerant;
   an indoor heat exchanger for cooling or heating a room, using the refrigerant;
   an outdoor heat exchanger for heat-exchanging the refrigerant with an outdoor air, the outdoor heat exchanger comprising a front heat exchange member and a rear heat exchange member;
   a defrosting module for adjusting an opening degree of a passage of the refrigerant introduced into the front heat exchange member and the rear heat exchange member; and
   a controller for controlling the defrosting module to operate the front heat exchange member or the rear heat exchange member as a condenser in a defrosting mode,
   wherein the defrosting module comprises,
   a first expansion valve to adjust an opening of a passage of the refrigerant introduced into the front heat exchange member; and
   a defrosting unit to adjust an opening degree of a passage of the refrigerant between the front heat exchange member and the rear heat exchange member,
   wherein the controller is configured such that when frost occurs on the front heat exchange member or the rear heat exchange member in a heating mode, the controller increases an opening degree of the first expansion valve to flow a high temperature refrigerant into the front heat exchange member and simultaneously decreases an opening degree of the defrosting unit to expand the refrigerant after passing the front heat exchange member into a low temperature refrigerant, only to operate the front exchange member as the condenser, and wherein the increasing of the opening degree of the first heat expansion valve is performed such that the refrigerant passing through the first expansion valve is expanded until the refrigerant has a predetermined temperature and a pressure sufficient to defrost the front heat exchange member.

2. The air conditioner according to claim 1, wherein the front heat exchange member is arranged in an outer position, compared with the rear heat exchange member, and the front heat exchange member and the rear transfer member are connected with each other.

3. The air conditioner according to claim 1, wherein the controller gradually increases the opening degree of the first expansion valve according to decrease of the temperature of the front heat exchange member or the rear heat exchange member where frost occurs.

4. The air conditioner according to claim 1, wherein when frost occurs only on the front heat exchange member in a heating mode, the controller increases an opening degree of the first expansion valve to draw a high temperature refrigerant into the front heat exchange member and simultaneously decreases an opening degree of the defrosting unit to expand the refrigerant into a low temperature refrigerant after passing the front heat exchange member, only to operate the front heat exchange member as the condenser.

5. The air conditioner according to claim 4, wherein when frost occurs on both of the front heat exchange member and the rear heat exchange member in the heating mode, the controller opens the defrosting unit and simultaneously operates the air conditioner in the same cycle as a cooling mode, only to operate the front heat exchange member and the rear heat exchange member as condensers.

6. The air conditioner according to claim 1, wherein the defrosting unit comprises, an opening/closing valve to open and close a passage of the refrigerant; and a second expansion valve connected with the opening/closing valve in parallel to expand the refrigerant.

7. The air conditioner according to claim 6, wherein when frost occurs only on the front heat exchange member, the controller increases an opening of the first expansion valve to draw a high temperature refrigerant into the front heat exchange member and simultaneously closes the opening/closing valve to enable the second expansion valve to expand the refrigerant after passing the front heat exchange member into a low temperature refrigerant, only to operate the front heat exchange member as a condenser.

8. The air conditioner according to claim 7, wherein when frost occurs on the front heat exchange member and the rear heat exchange member in the heating mode, the controller opens the opening/closing valve and simultaneously operates the air conditioner in the same cycle as a cooling mode, only to operate the front heat exchange member and the rear heat exchange member as condensers.

9. The air conditioner according to claim 1, further comprising:

a first temperature sensor provided in the front heat exchange member; and a second temperature sensor provided in the rear heat exchange member, wherein the controller determines whether frost occurs on the front heat exchange member and the rear heat exchange member based on the temperatures of front and rear heat exchange members measured by the first and second temperature sensors, respectively.

10. The air conditioner according to claim 1, wherein the rear heat exchange member is arranged adjacent to the front heat exchange member to transfer condensation heat of the refrigerant to the rear heat exchange member when the front heat exchange member is operated as a condenser.

11. The air conditioner according to claim 1, further comprising:

an outdoor fan to control the flow of outdoor air heat-exchanged in the outdoor heat exchanger, wherein when only the front heat exchange member is operated as a condenser to implement a defrosting mode, the controller controls the outdoor fan to blow air outside so as to prevent vapors or water from the front heat exchange member from flowing into the rear heat exchange member.

12. The air conditioner according to claim 1, wherein the defrosting unit is an electric ball valve.

13. The air conditioner according to claim 1, wherein the heat exchange capacity of the rear heat exchange member is larger than that of the front heat exchange member.

14. An air conditioner comprising:

a compressor for compressing refrigerant;

an indoor heat exchanger for cooling or heating a room, using the refrigerant;

an outdoor heat exchanger for heat-exchanging the refrigerant with an outdoor air, the outdoor heat exchanger comprising a front heat exchange member and a rear heat exchange member;

a defrosting module for adjusting an opening degree of a passage of the refrigerant introduced into the front heat exchange member and the rear heat exchange member, the defrosting module comprising: a first expansion valve to control an opening of a passage of the refrigerant drawn into the front heat exchange member; and a defrosting unit to adjust an opening degree of a passage of the refrigerant between the front heat exchange member and the rear heat exchange member; and a controller for controlling the defrosting module to operate the front heat exchange member or the rear heat exchange member as a condenser in a defrosting mode, wherein the front heat exchange member is arranged in an outer position, compared with the rear heat exchange member, and the front heat exchange member and the rear transfer member are connected with each other, wherein the controller is configured such that when frost occurs on the front heat exchange member or the rear heat exchange member in a heating mode, the controller increases an opening degree of the first expansion valve to flow a high temperature refrigerant into the front heat exchange member and simultaneously decreases an opening degree of the defrosting unit to expand the refrigerant after passing the front heat exchange member into a low temperature refrigerant, only to operate the front exchange member as the condenser, and wherein the increasing of the opening degree of the first heat expansion valve is performed such that the refrigerant passing through the first expansion valve is expanded until the refrigerant has a predetermined temperature and a pressure sufficient to defrost the front heat exchange member.

15. The air conditioner according to claim 14, further comprising:

a controller for controlling the defrosting module to operate the front heat exchange member or the rear heat exchange member as a condenser in a defrosting mode.

16. The air conditioner according to claim 15, wherein when frost occurs only on the front heat exchange member in a heating mode, the controller increases an opening degree of the first expansion valve to draw a high temperature refrigerant into the front heat exchange member and simultaneously decreases an opening degree of the defrosting unit to expand the refrigerant into a low temperature refrigerant after passing the front heat exchange member, only to operate the front heat exchange member as the condenser.

17. The air conditioner according to claim 16, wherein the rear heat exchange member is arranged adjacent to the front heat exchange member to transfer condensation heat of the refrigerant to the rear heat exchange member when the front heat exchange member is operated as a condenser.

18. The air conditioner according to claim 15, wherein when frost occurs on both of the front heat exchange member and the rear heat exchange member in the heating mode, the controller opens the defrosting unit and simultaneously operates the air conditioner in the same cycle as a cooling mode, only to operate the front heat exchange member and the rear heat exchange member as condensers.

* * * * *